United States Patent [19]

Bernat et al.

[11] 4,108,744

[45] Aug. 22, 1978

[54] RECOVERY OF THE ZINC CONTAINED IN THE RESIDUAL SOLUTIONS OBTAINED AFTER ELECTROLYTIC DEPOSITION

[75] Inventors: Jean-Pierre Bernat, Pau; Jean Sors, Bollene, both of France

[73] Assignee: Societe Nationale Elf Aquitaine, Paris, France

[21] Appl. No.: 783,699

[22] Filed: Apr. 1, 1977

[30] Foreign Application Priority Data

Apr. 2, 1976 [FR] France ................... 76 09587

[51] Int. Cl.² .................. C25C 1/16; C25D 21/16; C25D 21/22
[52] U.S. Cl. .................. 204/119; 75/101 BE; 423/100; 204/233
[58] Field of Search ............ 204/114, 117, 118, 119, 204/232, 237, 233; 423/100; 75/101 BE

[56] References Cited

U.S. PATENT DOCUMENTS

| 3,488,184 | 1/1970 | Hesler | 423/100 |
| 3,488,185 | 1/1970 | Oberhofer | 423/100 |
| 3,537,845 | 11/1970 | Oberhofer | 75/101 BE |
| 3,929,598 | 12/1975 | Stern et al. | 204/119 |

FOREIGN PATENT DOCUMENTS

37-1,252  6/1962  Japan ........................ 423/100

*Primary Examiner*—T. M. Tufariello
*Attorney, Agent, or Firm*—Ostrolenk, Faber, Gerb & Soffen

[57] ABSTRACT

Process for the recovery of the zinc contained in the residual solutions obtained after electrolytic deposition by fixing the zinc (none of the other metals present in the solution being included in said complex), in the form of a complex by adding of a alkaline metal halide (sodium chloride preferred) to the residual solution adjusted to a low acidity, for example, by dialysis. The process permits the almost total recovery of zinc, and a large part of sulfuric acid.

11 Claims, 1 Drawing Figure

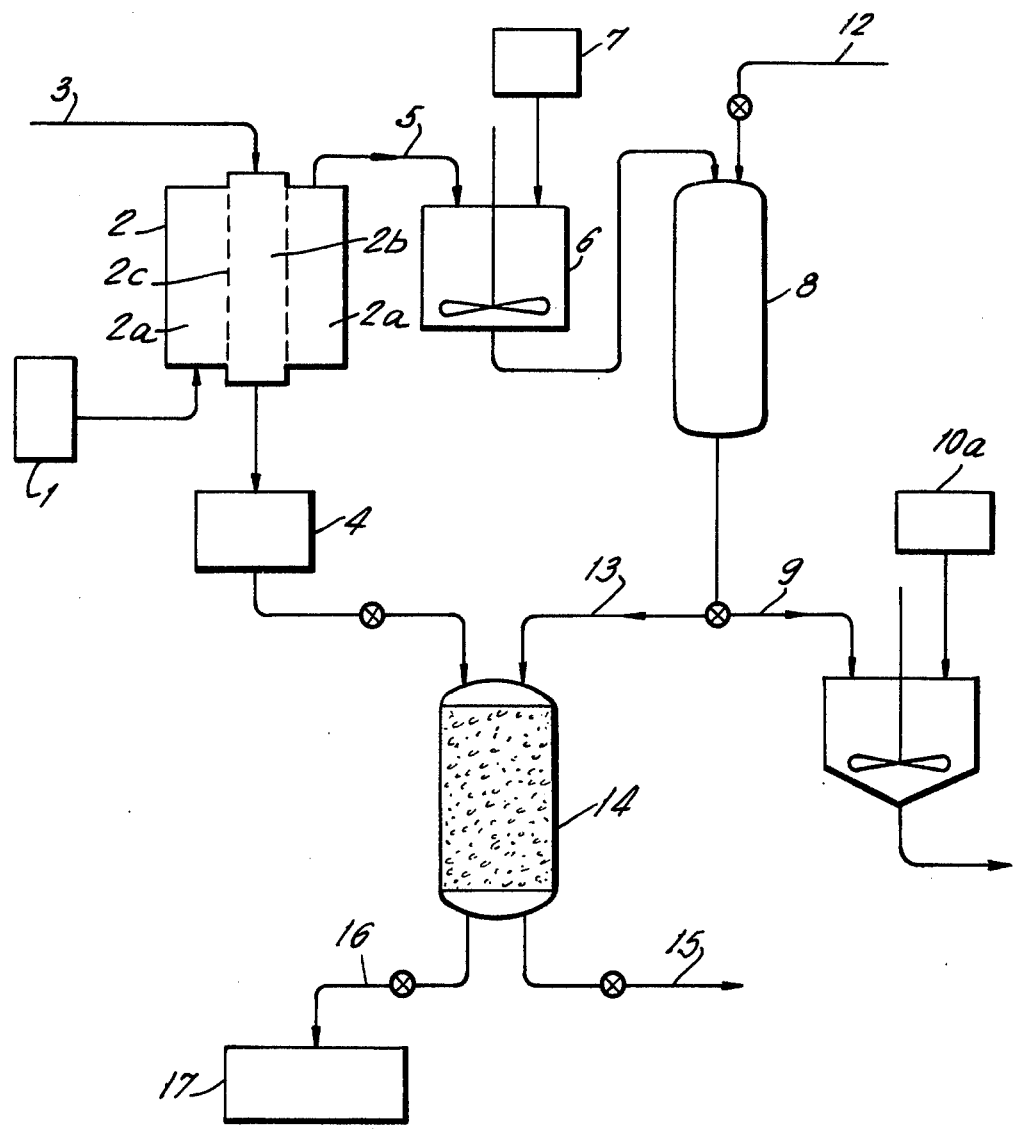

RECOVERY OF THE ZINC CONTAINED IN THE RESIDUAL SOLUTIONS OBTAINED AFTER ELECTROLYTIC DEPOSITION

The present invention is related to the recovery of the zinc contained in the residual solutions obtained after electrolytic deposition of this metal. The invention is also related to the separation and the elimination of the impurities, particularly of the magnesium accompanying the zinc in such solutions, as well as to the recovery of a portion of the sulphuric acid which is present in said solutions.

The electrolytic desposition of zinc, which is a well known industrial process, encounters certain difficulties, one of which is raised by the necessity of eliminating the magnesium sulphate which accumulates in the solution to be electrolyzed when the sulphuric liquors issuing from the electrolyzer are recycled during the treatment of the zinc ore with a view to extracting new amounts of zinc sulphate used for electrolytic deposition. This elimination is necessary since the presence of magnesium salts has unfavorable effects above a certain threshold of concentration on the formation of electrolytic zinc deposits, from a quantitative as well as from a qualitative point of view. It is thus necessary to purify the residual electrolytic solution as soon as the magnesium content reaches a certain limit value, the latter being generally between 15 and 20 g/liter, lest the energetic efficiency of the electrolytic process be considerably decreased; the starting ore may contain 0.4 to 4% magnesium. Furthermore, traces of other impurities which are deleterious to the electrolysis of the zinc ore, such as Fe, Co, Ni, Mn, etc., are present in the said solution. Since the solutions thus withdrawn from the cycle still contain Zn, there is a loss of zinc when these solutions are discarded. The problem is increased by the necessity of treating the effluents with a view to diminishing the polluting effect of said effluent prior to discarding the same by rejecting them into the natural environment. The neutralization of the sulphuric acid present requires the use of considerable amounts of lime or any other convenient neutralizing agent.

It is possible to consider the application of known processes for recovering the zinc from the solutions obtained after purification: the purification solution is treated with a view to eliminating the zinc therefrom by means of a cascade of special electrolytic vats in such a manner that a maximum amount of zinc is eliminated from the treated solution, the remaining zinc then being precipitated and the sulphuric acid being neutralized prior to rejecting the residual solution into the natural environment. However, this known method is not satisfactory from a technical point of view, as well as from an economical point of view.

The present invention allows the drawbacks of the known methods to be overcome and the magnesium and other impurities to be eliminated, and it also allows the zinc to be substantially entirely recovered under favorable and economically advantageous conditions. The invention thus allows zinc ore with a high magnesium content to be used, this kind of zinc ore being more accessible and less expensive than zinc ore having a lower magnesium content. Furthermore the invention, while allowing the zinc to be recovered, also allows simultaneously a considerable proportion of the sulphuric acid to be recovered, contrary to the known methods wherein said sulphuric acid is lost.

The novel process according to the invention comprises extracting the zinc contained in the residual solution resulting from electrolysis and withdrawn from the electrolytic production cycle, said zinc being extracted in the form of a complex wherein the zinc is part of the anion. This process of extracting comprises the steps of first forming the zinc complex (none of the other metals present in the solution being included in said complex) in an aqueous solution, and then fixing said complex by means of an anion exchanger.

The formation of the complex in accordance with the present invention may be performed by adding a sufficient amount of a metal halide to the slightly sulphuric solution containing the zinc to be recovered. For economical reasons, it is particularly advantageous to use sodium chloride to this end. Generally the proportion of halide used should be higher than the proportion corresponding to 4 moles thereof per zinc atom present in the form of sulphate. In the particular case where NaCl is used as a complexing agent, the resulting compound may be represented by the formula $$[ZnCl_4]Na_2$$

In practice, the NaCl concentration of the solution is comprised between 0.5 and 2 N, and is preferably comprised between 1 and 1.5 N. At these concentration values, the other metals, such as Ni, Co, etc., will not be included in the complex. The fixation of the complex is performed in an ion exchanger battery. Various anion exchangers may be used for fixing the halogenated zinc anion, particularly $[ZnCl_4]^{--}$. It is advantageous to use, for instance, strong synthetic anionic resins which are commercially available in a solid or a liquid form, and which are known under the commercial designations of Allassion A II or AW, Amberlite IR4B, IRA 400, IRA 410 or IR 45, Deacidite E 735 or FF, Duolite A2 or A10, Imac A 20 or S 3, Permutite E, W or A 230, Dowex 1, 2 or 3, etc.

As the formation of the anionic zinc complex requires a medium which is only slightly acid, and since the residual electrolytic solutions have generally a rather high sulfuric acid content, it is recommended that this acidity be reduced prior to introducing the zinc into the complex. According to a particular feature of the present invention, the $H_2SO_4$ concentration is lowered by dialysis. The solution first undergoes a clarification treatment on a cartridge filter which retains the solid particles having a size equal to or lower than 5 microns. This solution then flows through a group of dialysis cells, while demineralized water is present at the opposite side of the previous diaphragm. As a result of ion exchange, this solution looses the major portion of its sulphuric acid content, while retaining the other elements. Thus a diluted sulphuric acid solution is obtained which may be recovered; this constitutes a novel feature in the field of electrolytic deposition of zinc. On one side of the diaphragm, the dialysate obtained is constituted by the residual solution containing mainly zinc and magnesium and having a considerably decreased sulphuric acid content; this slightly acid solution is used for transforming the zinc content into a complex.

By way of example, the residual solution may have the following composition:

| | | |
|---|---|---|
| $Zn^{++}$ | 10 to | 70 g/liter |

| -continued | | |
|---|---|---|
| $Mg^{++}$ | 5 to | 20 g/liter |
| $H_2SO_4$ | 120 to | 200 g/liter |
| $Mn^{++}$ | 1 to | 2 g/liter |
| $Ca^{++}$ | <1 | g/liter |
| $Cl^-$ | <0.4 | g/liter |
| $F^-$ | <0.03 | g/liter | prior to dialysis, whereas after dialysis of said solution, the latter has a sulphuric acid content of only 5 to 50 g per liter, the separated diluted acid solution containing 120 to 200 g $H_2SO_4$.

Starting from the anion exchanger on which the zinc-containing anion has been fixed, the latter may be used in different ways, whereas the liquid which remains after the fixing of the zinc is constituted by:

| $Zn^{++}$ | 3 | mg/liter |
|---|---|---|
| $Mg^{++}$ | 5 to | 20 g/liter |
| $H_2SO_4$ | 5 to | 50 g/liter |
| $Cl^-$ | 10 to | 150 g/liter | and is discarded after a convenient neutralisation treatment.

By eluting the anion exchanger containing the zinc, by means of demineralized water, it is possible to obtain a halogenated zinc solution, particularly a solution of $ZnCl_2$. Thus the zinc contained in the residual solution is recovered, the $ZnCl_2$ solution being usable for any known application.

The separation on resins allows a zinc-containing solution without impurities to be obtained, since Mg and Mn as well as the traces of Co, Ni, Ge and Se present in the electrolyte have been eliminated.

According to one particular feature of the invention, this zinc salt solution, which is practically pure, is passed on a convenient cation exchanger constituted for example by one of synthetic resins known under the commercial designations Allassion S or C S, Asmit, Duolite C 3 or C 10, Levatit K S N, Amberlite IR 120, Dowex 50, Permutit Q, etc. The remaining liquor is then evacuated after neutralisation, while the exchanger, which is loaded with Zn cation, may be eluted by means of a convenient acid, whereby the corresponding zinc salt is obtained. According to a particularly economical embodiment of the invention, the diluted sulphuric acid solution stemming from the dialysis is used for this elution; a zinc sulphate solution is thus obtained, which may be recycled in the electrolytic process. In this manner, it is possible to recover not only the zinc but also a considerable portion of the sulphuric acid contained in the residual solution resulting from the electrolytic zinc deposition process.

The appended drawing shows, by way of example, but not of limitation, a simplified diagrammatic view of an installation for carrying out the method according to the invention. It should be noted that this drawing only shows the essential devices; the various elements, organs or containers, which are well known by those skilled in the art, such as pumps, storing tanks, decanters, centrifugal apparatus, clarifying apparatus and so forth are not represented in the drawing, since their use is well known.

As shown in the drawing, the effluent solution 1 passes through a dialyser 2, flows upwards in compartment 2a along a diaphragm 2c which separates compartment 2a from an inner compartment 2b. The latter defines a flow path for demineralized water which enters compartment 2b by conduit 3 and flows downwardly, as shown in the drawing. With a view to simplifying the drawing, only one dialytic element is shown, it being well understood that in industrial practice a whole series of such elements are generally used.

The residual solution stemming from the electrolytic deposition process, which solution constitutes the effluent solution 1, has a high sulphuric acid content; this acid thus will diffuse through diaphragm 2c into compartment 2b; consequently the solution issuing from compartment 2a through conduit 5 has a lower sulphuric acid content, but it still contains the entire amount of zinc which was initially present in said solution, as well as the entire initial amount of magnesium and other impurities.

The residual solution, which thus has a decreased sulphuric acid content, flows into a reactor vat 6 wherein the convenient complexing agent is added to said solution, this complexing agent being advantageously constituted by NaCl fed from a tank 7 or a similar source. Consequently the zinc sulphate is converted into the anionic zinc complex, particularly $[ZnCl_4]Na_2$. The solution of this complex is passed into the upper end of column 8 which contains an anion exchanger advantageously constituted by a synthetic resin. The halogenide concentration (more particularly the NaCl concentration) in vat 6 being conveniently adjusted, only the zinc is incorporated in the complex, whereas the other metals present, including Na, remain in the solution. Consequently only the complex zinc anion is fixed to the exchanger in column 8. The remaining liquor leaves this column by flowing through conduit 9, and is neutralized in a container 10, generally by means of lime issuing from 10a. The impurities, which are thus rendered non-polluting, are finally evacuated at 11.

The extraction of the zinc, retained by the anion exchanger in column 8, is then performed by elution by means of demineralized water issuing from 12. The eluate which is then withdrawn from column 8 through conduit 13 is a hydrochloric solution of $ZnCl_2$; if there is no possibility of using this solution directly the same is introduced into the upper part of a column 14 loaded with a cation exchanger. This cation exchanger may be constituted by one of the above mentioned synthetic resins. During this operation, the zinc in the form of cation is, in this case, fixed on the exchanger of column 14, while the liquor which has flowed through said column is directed through 15 toward a neutralization station and then evacuated. The thus fixed zinc is then recovered in the form of a sulphate solution, by eluting with the weak sulphuric acid solution issuing from 4, which has been obtained by the dialysis at 2, as described herein-above. The zinc sulphate solution thus recovered flows through conduit 16 toward the storing station 17 from which it can be taken up again so as to be re-introduced into the electrolytic cycle.

The following non-limitive numerical example illustrates the invention in a more detailed manner.

A residual solution of an installation for electrolytic deposition of zinc has the following composition (expressed in g/liter):

| Zn | 40 |
|---|---|
| Mg | 15 |
| Fe+Cu+Ni+CO+Mn | 2 |
| $H_2SO_4$ | 120 |

This solution is dialyzed with 1.1 m³ demineralized water per m³ of solution. 1 m³ sulphuric acid at 100 g/liter is then obtained, while the residual solution only contains 20 g/liter $H_2SO_4$.

65 kg NaCl is added to this solution in the reaction vat 6, with a view to forming the anionic zinc complex.

The solution of the complex then flows into column 8 loaded with IRA 400 resin. The liquor which has flown through the resin bed is evacuated through 9 into container 10 and is then treated with lime and evacuated, as described herein above.

The resin is then eluted with 3 m³ demineralized water issuing from 12, and the solution thus obtained is introduced through 13 into column 14 filled with IR 120 resin. The liquor issuing from the lower end of the filling material 14 is withdrawn through 15 and neutralized, and then evacuated. When the exchange in column 14 is finished, the resin is eluted with 1 m³ diluted sulphuric acid issuing from 4; an amount of 2 m³ $ZnSO^4$ solution containing 20 g/liter zinc is then obtained, this solution being sufficiently pure and substantially free of magnesium so as to be adapted to be recycled in the lixiviation treatment of the zinc ore.

What is claimed is:

1. A method for recovering zinc and sulfuric acid from a residual aqueous solution containing more than 50 grams of $H_2SO_4$ per liter which remains after carrying out electrolytic zinc deposition process, the method comprising the following steps:
    (a) dialyzing the solution to form a first solution containing the zinc and up to 50 grams per liter of $H_2SO_4$ and a second solution containing more than 50 grams $H_2SO_4$ per liter;
    (b) adding to the first solution thus obtained at least 4 moles of NaCl per atom of zinc present, whereby the zinc is complexed;
    (c) contacting the zinc complexed first solution with an anion exchange resin;
    (d) separating the resulting first solution containing substantially no zinc from the anion exchange resin, and
    (e) eluting the anion exchange resin to recover the zinc therefrom.

2. A method according to claim 1, wherein said residual solution contains 120 to 200 grams $H_2SO_4$ per liter.

3. A method according to claim 1, wherein said residual solution contains 10 to 70 grams of zinc per liter.

4. A method according to claim 1, wherein said residual solution contains 5 to 20 grams magnesium per liter.

5. A method according to claim 1, wherein said second solution contains 120 to 200 grams $H_2SO_4$ per liter.

6. A method according to claim 1, wherein said residual solution contains 10–70 grams per liter of Zn, 120–200 grams per liter of $HSO_4$ and 5–20 grams per liter of Mg, said sodium chloride is added to a concentration of 0.5–2 N, and said anion exchange resin is eluted with water.

7. A method according to claim 1, wherein the formation of said complex is performd by adding sodium chloride, to a concentration in the solution of between 0.5 and 2 N, 8. A method according to claim 7, wherein the NaCl concentration in the solution is comprised between 1 and 1.5 N.

9. A method according to claim 1, wherein the anion exchanger is eluted with water, whereby the zinc is freed in the form of a zinc chloride solution.

10. A method according to claim 9, wherein the zinc chloride solution obtained is treated with a cation exchanger so as to fix the Zn cation, said cation exchanger being then eluted with a convenient acid and the zinc salt solution thus obtained being recovered.

11. A method according to claim 10, wherein the acid used for the elution of the cation exchanger is the said second solution.

* * * * *